United States Patent Office 3,203,786
Patented Aug. 31, 1965

3,203,786
METHOD FOR OBTAINING NICKEL AND COBALT OUT OF LOW-GRADE SILICATE ORES AND OF METALLURGICAL OFFALS
Korneliusz Kazimierz Wesolowski, Warsaw, Michal Wladyslaw Ryczek, Cracow, Stanislaw Tochowicz and Zbigniew Katra, Stalinograd, Witold Grabowski and Jerzy Godek, Zabkowice, Jan Michalski, Warsaw, and Stefan Kijak, Stettin, Poland, assignors to Politechnika Warszawski, a technical university of Warsaw, Poland, and Zaklady Gorniczo-Hutnicze Szklary, an enterprise of Poland
No Drawing. Filed July 20, 1962, Ser. No. 211,409
Claims priority, application Poland, July 21, 1961, P 97,002
2 Claims. (Cl. 75—82)

It is an object of the invention to provide a method for obtaining nickel and cobalt out of low-grade silicate nickel ores, sponge-iron slag, shaft kiln slag and other metallurgical materials.

At present nickel is obtained from silicate ores, sulphide ores and arsenide ores. Silicate ores are melted in shaft kilns, sulphide ores are enriched by the flotation method to a copper-kiln concentrate or are melted in shaft kilns to give nickel matte, while arsenide ores are worked up to nickel according to the carbonyl method.

The above mentioned methods are used for working up ores rich (3–5%) in nickel. Ores with a mediocre nickel content (about 2%) are worked up in the hydrometallurgical way by means of lixiviation with ammonia or with sulphuric acid.

Ores with a lower nickel content (up to about 1%) are not worked up to pure nickel, but they are worked up according to the Krupp-Renn method to low-grade iron-nickel.

All the above described methods for working up rich, mediocre and poor ores reveal great nickel losses, hence a low nickel yield which amounts to a maximum of, e.g., 75%. When working up low-grade silicate ores to iron-nickel according to the Krupp-Renn method, 35–45% or so of the nickel from the ore remain in the slag.

The nickel content in the slag after the Krupp-Renn method is from 0.14 to 0.25% Ni, and the nickel content of the shaft kiln slag upon working up mediocre and rich ores reaches even 0.9% Ni.

These slags, although they contain nickel and other valuable constituents, as well as poor silicate ores with a nickel content of less than 0.7% Ni have not found industrial utilization and are considered as offals unsuitable to any further treatment.

Methods for working up sponge-iron slag, shaft kiln slag and silicate ores poor in nickel, e.g. by lixiviation with ammonia, followed by roasting in an atmosphere of gases containing sulphur dioxide or chlorine, are known, but they gave no greater yield of nickel and of other constituents, are expensive, difficult and troublesome in the production and by this reasons they have not found utilization on a large scale.

The method according to the invention removes the drawbacks and inconveniences of hitherto used methods, its output is far better and it is less expensive.

The method according to the invention admits to obtain nickel and cobalt out of sponge-iron slag, shaft kiln slag, etc. and out of poor nickel ores containing nickel silicates or nickel silicates and cobalt silicates.

The method consists in conveniently preparing the kiln charge, roasting it in convenient conditions and in manifoldly lixiviating the roast material. The kiln charge consists of broken poor silicate ores or of metallurgical offals and of materials containing native sulphur, sulphides, sulphates or sulphites such as $FeS_2$, $FeS$, $FeSO_4$, $CaS$, $CaSO_4$ and alkaline metal chlorides or alkaline earth metal chlorides such as $NaCl$, $CaCl_2$.

After thoroughly mixing, the charge is put into the kiln where the charge is roasted at a temperature of from 250 to 600° C., preferably at a temperature of about 400° C. During roasting, the nickel and the cobalt pass from their forms being insoluble in water or in weak silicate acids, into the form of easily soluble chlorides, oxychlorides or complex chlorides-sulphates due to the fact that they are acted upon by oxides of chlorine, sulphur oxychlorides, chloride of sulphur, and sodium thiosulphate or calcium thiosulphate which came to rise during roasting.

Nickel and cobalt are passed from the roast material into the solution by lixiviating with water, weak acids or with ammonia and subsequently the solution is separated from insoluble silicates. Apart from nickel and cobalt, the solution contains iron, manganese, magnesium and mirabilite.

The recovery of the individual metals from the solution is carried out by means of aqueous and acidic lixiviation according to two methods.

The first method consists in selectively precipitating iron, cobalt and nickel, with temporarily oxidizing, under gradual increase of the pH-value of the solution. At first precipitates the iron at a pH-value of 4, 5, then precipitate the cobalt and the manganese with the still remaining iron at a pH-value of 5, 5, and subsequently precipitate nickel at a pH-value of 6 and magnesium at a pH-value of 7–8 in form of insoluble hydroxides.

The cobalt-iron sediment is worked up to cobalt or to iron-cobalt, and the nickel sediment is worked up to nickel or to iron-nickel according to known methods.

The second method, being a modification of the first one and less sensitive to exact pH-limits, consists in jointly precipitating iron, nickel and cobalt at a pH-value of above 7 by means of lime milk or of other alkalis or alkaline earths, and subsequently automatically oxidizing the bivalent iron in the sediment to trivalent iron by continuously stirring by means of air or mechanically at a temperature of above 40° C. After the iron has been completely oxidized and the solution has been separated from the joint sediment, the latter is treated with a weak 1% sulphuric acid or hydrochloric acid to dissolve the nickel and the cobalt and the remaining magnesium at a pH-value of minimum 4, because at a lower pH-value too much iron would pass into the solution.

From the thus obtained secondary nickel solution, when increasing the pH to a value of maximum 6, nickel and cobalt with alkalis in form of bivalent hydroxides are precipitated. Care must be taken that pH does not exceed the value 6, because otherwise too much $Mg(OH)_2$ would precipitate.

Another method for obtaining nickel and cobalt from the secondary solution consists in that without changing the pH-value of 4, nickel and cobalt are precipitated by means of calcium hypochlorite or soda in form of tetravalent hydroxides containing nearly no $Mg(OH)_2$.

From the obtained nickel-cobalt sediments the nickel is separated from cobalt and is worked up according to known methods.

The process according to the invention allows to obtain out of metallurgical silicate offals and of poor oxygen nickel ores, concentrates containing nickel more than 30% and iron less than 1%, and out of the concentrates to obtain nickel or iron nickel with a yield of more than 90%. The solutions separated from the sediments contain a great part of magnesium which can be obtained in form of hydroxides by increasing the pH-value of the solution to 9–10 or in form of magnesium oxide which can be utilized in the ceramic and metallurgical industries. Also mirabilite is obtainable from the solutions by known methods.

Weak acids for lixiviating the roast-material are obtainable when carrying out the process according to the invention, by dissolving roasting gases in water, which fact is also an advantage of the process.

*Example.*—To 100 kg. of an oxygen nickel ore containing 0.5% Ni, 0.05% Co, 8% Fe with 6% of physically combined $H_2O$, of a granulation up to 3 mm., are added 20 kg. of pyrite containing 40% of S with 2% physically combined $H_2O$, of a granulation up to 1 mm., and stone salt containing min. 90% NaCl of a granulation up to 3 mm., upon which the whole mixture is stirred. The mixture is moistened with water so that the whole water content does not exceed 8%, whereupon the mixture is brought in a continuous manner into the roasting kiln with admission of air and with mechanically stirring the charge. On the upper hearths the charge is heated by means of gas up to the moment of reaching a temperature initiating the process. Upon reaching a temperature of 250° C., the heating of the charge is interrupted. Due to roasting, the insoluble compounds of nickel, cobalt, iron, etc. pass into the form of soluble compounds. The gases arising with roasting are led off to absorption towers where by the use of a water sprayer a weak mixture of acids is obtained which is used for lixiviating the roast-material and the sediments. The roast-material is lixiviated in a counter-current in consequence of which the soluble compounds pass into the solution, while the roast-material after having been 20–40 times thoroughly lixiviated is treated as offal in which the nickel content does not exceed 0.05%. During the lixiviation more nickel passes into the solution than iron, the behaviour of cobalt is the same as that of nickel. The obtained lye containing 1–3 g./l. of nickel, 0.1–0.3 g./l. of cobalt, about 3 g./l. of iron and some percents of sodium sulphate are cooled to obtain mirabilite, what improves the solubility of more difficultly soluble compounds in the lye, whereupon the lye is subjected to a collective precipitation of nickel, cobalt, iron by adding lime milk for the purpose of obtaining a pH-value of 8 of the solution, at which with admission of air the oxidation of the bivalent iron to trivalent iron takes place. The obtained sediment is treated with acid to obtain a pH-value of 4, at which the nickel and the cobalt pass into the solution. From the solution are precipitated by means of calcium hypochlorite the nickel and the cobalt in form of tetravalent hydroxides, being the end product of the process according to the invention.

We claim:
1. A method of recovering nickel and cobalt from low grade metallurgical materials comprising the steps of mixing particles of a low grade metallurgical material having a nickel content of less than 1% with a sulfur containing material and a metal halide selected from the group of alkaline metal chlorides and alkaline earth metal chlorides, roasting the mixed material at a temperature of from 250° C. to 600° C. in the presence of oxygen, leaching the roasted mixture with an agent selected from the group of water, weak acid, and ammonia to put nickel and cobalt into solution, and increasing the pH of the solution to at least 7 to form a sediment comprising nickel and cobalts, treating said sediment with an oxidizing agent to oxidize iron present in said sediment to the trivalent state, dissolving nickel and cobalt from the sediment with an agent selected from the group consisting of weak sulfuric and weak hydrochloric acid to form a second solution having a pH of at least 4, and precipitating nickel and cobalt from said second solution at a pH of less than 6.

2. A method according to claim 1 wherein the precipitation of nickel and cobalt from said second solution is accomplished by maintaining the pH of said second solution substantially unchanged while adding an agent selected from the group consisting of calcium hypochlorite, sodium hypochlorite, and potassium hypochlorite to precipitate nickel and cobalt as the tetravalent hydroxide.

References Cited by the Examiner
UNITED STATES PATENTS

| | | | |
|---|---|---|---|
| 1,487,145 | 3/24 | Caron | 75—82 |
| 2,205,565 | 6/40 | Kissock | 75—119 |
| 2,379,659 | 7/45 | Schaal | 75—82 |
| 2,831,751 | 4/58 | Birner | 23—61 |
| 2,867,503 | 1/59 | Roy | 75—72 |

FOREIGN PATENTS 514,098  6/55  Canada.

DAVID L. RECK, *Primary Examiner.*
WINSTON A. DOUGLAS, BENJAMIN HENKIN,
*Examiners.*